May 15, 1951      E. W. DAVIS      2,553,177
MEASURING VALVE
Filed Jan. 31, 1946
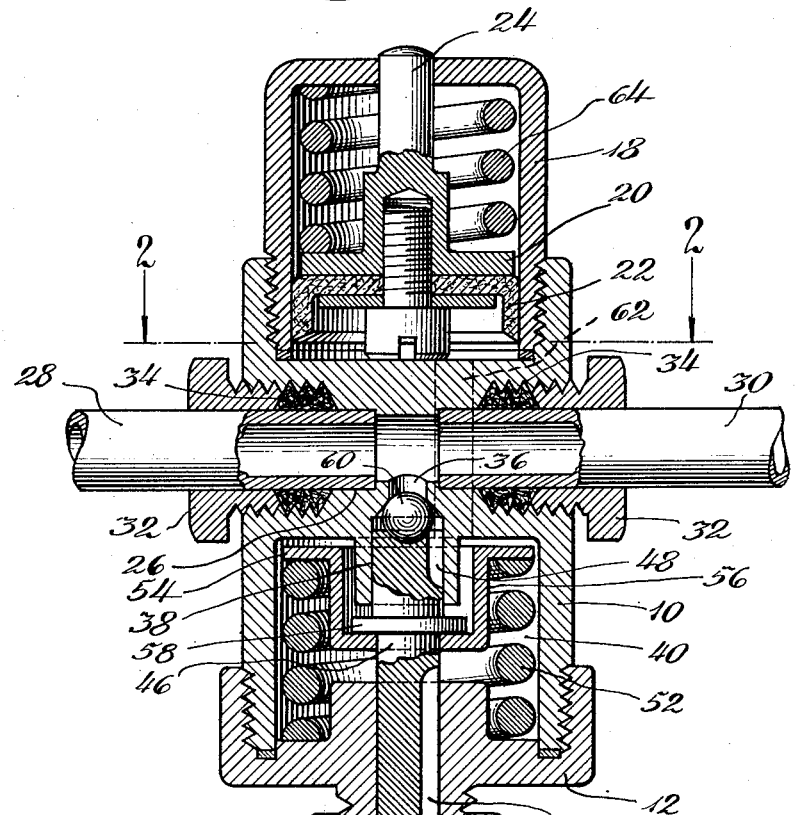
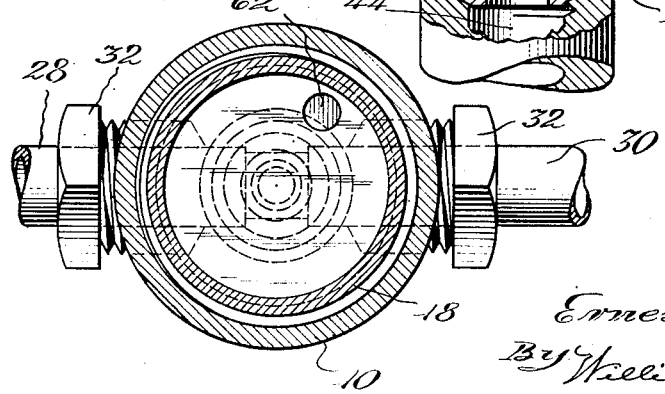
Inventor:
Ernest W. Davis
By Williams, Bradbury & Hinkle
Attorneys Patented May 15, 1951

2,553,177

UNITED STATES PATENT OFFICE 2,553,177

MEASURING VALVE

Ernest W. Davis, River Forest, Ill.

Application January 31, 1946, Serial No. 644,476

2 Claims. (Cl. 184—7)

This invention relates to lubrication systems in which a plurality of bearings, such as all the bearings of a single machine, are arranged to be lubricated periodically from a central supply, and the invention is concerned with a measuring valve adapted to be fitted to each of the bearings requiring lubrication and to feed lubricant thereto.

One object of the invention is to provide a new and improved measuring valve of simple and economical construction.

Another object of the invention is to provide a new and improved measuring valve having a single valve member controlling the inlet and outlet alternatively in response to the periodic supply of lubricant under pressure and the interruption of such supply.

More specifically it is an object of the invention to provide a measuring valve in which the ports and cavities of each part are disposed mainly in co-axial relation so as to simplify the processes of manufacture.

Other objects and advantages of the invention will appear from the following description taken in connection with the drawings, in which Fig. 1 is a substantially axial sectional view of the measuring valve embodying this invention; and Fig. 2 is a transverse section taken as indicated at line 2—2 on Figure 1.

The measuring valve, which is the subject of this invention, is of relatively simple construction. It includes a cylindrical body member 10 threaded at its lower end to fit into the flanged base 12 which is provided with a threaded stem 14 to be secured in a boss or other apertured feature 16 adjacent the bearing to be lubricated. At the upper end the body 10 is internally threaded to receive the lower end of a pressure reservoir cylinder 18 which is fitted with a piston 20 having a cup-shaped packing member 22 and provided with a stem 24 adapted to protrude through a central opening in the end of the cylinder 18. The body 10 has a transaxial bore 26 which may be counterbored from opposite ends to receive sections 28 and 30 of the lubricant supply line secured by suitable glands 32 and packing material 34. A port 36 in the body 10 opens into the bore 26 to provide an inlet for lubricant which is supplied through the line 28, 30.

The port 36 connects with an inlet passage 38 which leads to a chamber 40 formed in the lower portion of the body 10. An outlet or discharge passage 42 extends from the chamber 40 through the stem 14 for communication with the duct 44 through which lubricant is supplied to the bearing (not shown). The inlet passage 38 and outlet passage 42 are disposed in axial alignment and may be of the same diameter, and said passages are controlled by a slide valve member 46 having a lateral groove 48 which opens through the upper end of the valve toward the inlet port 36, and a second lateral groove 50 which opens through the lower end of the valve member into the discharge passage 42. When the valve member is shifted to its upper limit as shown in Fig. 1, the groove or channel 48 is closed by the wall of the inlet passage 38 but the upper end of the groove or channel 50 is exposed in the chamber 40. When the valve is shifted downwardly to its opposite limit, the lower end of the groove 48 is exposed in the chamber 40 while the upper end of the groove 50 is closed by the wall of the passage 42.

The valve member 46 is controlled by a coil spring 52 pocketed in the chamber 40 and seated against the lower end thereof, which is formed by the flanged base 12. The upper end of the spring reacts against the outturned flange 54 of a cup-shaped member 56 which is fitted on to the valve member 46 just below a flange or collar 58 on said valve member. The bottom wall of the cup-shaped member 56 engages the lower face or shoulder of the collar 58 so that the spring 52, acting upwardly against the flange 54 of said cup-shaped member, normally holds the valve member 46 at its upper limit in the position illustrated in Figure 1. The upper end of the valve member carries a ball 60 and the port 36 is formed with a suitable seat for said ball so that the ball 60 serves as a check valve for the port 36.

When lubricant under pressure is supplied from the feed line 28, 30, either direction through the feed line 28, 30, the pressure forces open the check valve 60 and moves the valve member 46 downwardly in opposition to the pressure of its spring 52 until the lower end of the groove or channel 48 is exposed in the chamber 40 and lubricant flows through this channel to fill said chamber. The chamber 40 is in constant communication with the cylinder 18 through a passage 62 extending upwardly through the body 10, as shown in dotted outline in Figure 1 and in full lines in Figure 2. Therefore upon the opening of the valve 46, the lubricant not only fills the chamber 40 but rises through the passage 62 and forces the piston 20 upwardly in opposition to the force of its spring 64, the inlet pressure of lubricant being sufficient to overcome said spring. Since the outlet channel 50 of the valve 46 is closed whenever the inlet channel 48 is open, the filling process will continue only until the chamber 40, passage 62 and cylinder 18 are filled to their capacity with lubricant, or until the inlet pressure is insufficient to further compress the spring 64. The supply of lubricant under pressure is not continuous but is provided either at regular intervals under automatic control or at intervals dictated by the judgment of the attendant. In either case, as soon as the supply pressure is no longer applied through the line 28, 30, the spring 52 will react to return the valve member 46 to its upper limit, closing the inlet channel 48 and seating the check valve 60, but opening the channel 50 by exposing its upper end in the chamber 40. The energy stored in the spring 64 will then urge the piston 20 downwardly, forcing the lubricant from the cylinder 18 through the passage 62 and chamber 40 into the outlet passage 42 through which it will flow to the bearing to be lubricated.

The force of the spring 64 may be sufficient to expel the entire charge of lubricant suddenly or rapidly or in some cases the spring 64 may act gradually to feed lubricant continuously to the bearing as required thereby. Thus it may happen that the lubricant supplied for some bearings may be entirely exhausted by the time additional lubricant is furnished through the pressure line 28, 30, whereas at other bearings only a portion of the contents of the cylinder 18 may have been used up in this interval. Obviously the measuring devices at the latter bearings will be refilled to capacity each time the system is operated to supply lubricant under pressure through the line 28, 30, but such operation of the system must be repeated at sufficiently frequent intervals to properly service the bearings requiring the most lubrication. In some instances, measuring valves of different capacities may be installed at the different bearings to insure that each bearing is furnished with an adequate supply of lubricant each time the system is operated. In any case the stem 24 of the piston 20 will be protruded through the end of the cylinder 18 when the cylinder is filled with lubricant and will withdraw into the cylinder as lubricant is expelled therefrom to the bearing. These stems 24 of the several measuring valves of a system will indicate for each bearing the rate at which lubricant is being fed to it, or if the bearing should be clogged, the continued protrusion of the stem 24 will call attention to that fact so that proper treatment can be given before the bearing is burned out or otherwise injured.

It may be noted that the structure of the measuring valve is quite simple as viewed from a manufacturing standpoint. The cylindrical body member 10 is axially bored at its upper end and threaded to receive the cylinder 18, and it is axially bored from the lower end to form the chamber 40 with a smaller axial bore 38 for the slide valve, this bore terminating in the slightly smaller port 36. The lower end of the body is also externally threaded. All these features are co-axial, which will permit finishing the part in a single machine set-up. Simple additional operations will form the cross-bore 26 and its counterbored and threaded end portions. The base 12 is also a very simple manufacturing problem as is the cylinder 18. The passage 62 may be a cored hole in the part 10 which will normally be a casting. The slide valve member 46 and the piston 20 are simple cylindrical elements readily manufactured in quantity and if the springs 52 and 64 are selected properly, the assembly of the structure will amount to little more than screwing the parts together.

While there is shown and described herein certain structure embodying the invention and illustrative thereof, it is to be understood that the invention is not limited thereto or thereby but embraces all changes and modifications in its various features which may come within the scope of the appended claims.

I claim:

1. A measuring valve for centralized lubricating systems, comprising a body having a chamber and aligned cylindrical inlet and outlet passageways leading to and from the chamber, a single valve member having generally cylindrical parts reciprocable respectively in said passageways, said parts having grooves therein extending from their ends toward the center of the valve member, the adjacent ends of the grooves being spaced a distance approximating that between the adjacent ends of the passageways, a spring in said chamber normally urging said valve member to close the inlet passageway, and a pressure reservoir communicating with the chamber.

2. A measuring valve for centralized lubricating systems, comprising a body having a chamber and bosses extending into the opposite ends of the chamber, said bosses having aligned inlet and outlet passageways leading to and from the chamber, a single valve member having parts guided respectively in said passageways and constructed to close the ends of the passageways alternatively, a flanged cup-shaped spring seat engaging the valve member and surrounding the boss for the inlet passageway, a coil spring in said chamber compressed between the spring seat and one end of the chamber, said spring surrounding the bosses and normally urging said valve member to close the inlet passageway, and a pressure reservoir communicating with the chamber.

ERNEST W. DAVIS.

REFERENCES CITED

The following references are of record in the file of this patent:

UNITED STATES PATENTS

| Number | Name | Date |
|---|---|---|
| 1,779,351 | Armstrong | Oct. 21, 1930 |
| 1,942,096 | Hallerberg | Jan. 2, 1934 |
| 2,003,281 | Bijur | June 4, 1935 |
| 2,016,373 | Kennedy | Oct. 8, 1935 |

FOREIGN PATENTS

| Number | Country | Date |
|---|---|---|
| 36,967 | France | May 20, 1930 |
| 505,538 | Germany | Aug. 22, 1930 |